US012565030B2

(12) United States Patent
Liao et al.

(10) Patent No.: US 12,565,030 B2
(45) Date of Patent: Mar. 3, 2026

(54) ANTI-BACTERIAL AND FLAME-RETARDANT WALL COVERING STRUCTURE

(71) Applicant: NAN YA PLASTICS CORPORATION, Taipei (TW)

(72) Inventors: Te-Chao Liao, Taipei (TW); Ching-Yao Yuan, Taipei (TW); Teng-Ko Ma, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 220 days.

(21) Appl. No.: 18/520,706

(22) Filed: Nov. 28, 2023

(65) Prior Publication Data

US 2025/0100259 A1     Mar. 27, 2025

(30) Foreign Application Priority Data

Sep. 25, 2023    (TW) ................................. 112136536

(51) Int. Cl.
*B32B 27/32*         (2006.01)
*A01N 25/10*         (2006.01)
(Continued)

(52) U.S. Cl.
CPC .............. *B32B 27/32* (2013.01); *A01N 25/10* (2013.01); *A01N 29/00* (2013.01); *B32B 5/024* (2013.01); *B32B 7/02* (2013.01); *B32B 25/08* (2013.01); *B32B 25/10* (2013.01); *B32B 25/14* (2013.01); *B32B 27/08* (2013.01); *B32B 27/12* (2013.01); *B32B 27/18* (2013.01); *B32B 27/304* (2013.01);
(Continued)

(58) Field of Classification Search
CPC ....... B32B 27/12; B32B 27/304; B32B 27/32; B32B 27/322; B32B 27/327; E04F 13/00–13/30
See application file for complete search history.

(56) References Cited

U.S. PATENT DOCUMENTS

2013/0210303 A1* 8/2013 Doi ......................... B32B 27/18
                                                              428/688
2021/0107266 A1* 4/2021 Liao ........................ B32B 27/32

FOREIGN PATENT DOCUMENTS

CN          116141787 A      5/2023
TW          201511949 A      4/2015
(Continued)

*Primary Examiner* — Prashant J Khatri
(74) *Attorney, Agent, or Firm* — Li & Cai Intellectual Property (USA) Office

(57) ABSTRACT

An anti-bacterial and flame-retardant wall covering structure is provided. The wall covering structure includes a fiber substrate, two polyolefin substrates, and an anti-bacterial layer. The two polyolefin substrates are formed on both side surfaces of the fiber substrate to form a sandwich laminate. A polyolefin composition of each of the polyolefin substrates includes a first polyolefin resin material, a second polyolefin resin material, and a flame-retardant additive material. The first polyolefin resin material is a polyethylene resin, and the second polyolefin resin material is a polypropylene resin that includes a propylene block copolymer. Based on a total weight of the polyolefin composition being 100 parts by weight, a content of the propylene block copolymer is not less than 5 parts by weight. The anti-bacterial layer is formed on a surface of the sandwich laminate and includes a fluorine-containing polymer.

16 Claims, 1 Drawing Sheet

100

S { 1
    2

(51) Int. Cl.

| | | |
|---|---|---|
| *A01N 29/00* | (2006.01) | |
| *B32B 5/02* | (2006.01) | |
| *B32B 7/02* | (2019.01) | |
| *B32B 25/08* | (2006.01) | |
| *B32B 25/10* | (2006.01) | |
| *B32B 25/14* | (2006.01) | |
| *B32B 27/08* | (2006.01) | |
| *B32B 27/12* | (2006.01) | |
| *B32B 27/18* | (2006.01) | |
| *B32B 27/30* | (2006.01) | |
| *C08J 5/12* | (2006.01) | |
| *C08J 7/04* | (2020.01) | |
| *C08K 3/22* | (2006.01) | |
| *C08K 5/00* | (2006.01) | |
| *C09D 5/14* | (2006.01) | |
| *C09D 11/102* | (2014.01) | |
| *C09D 127/14* | (2006.01) | |

(52) U.S. Cl.
CPC ............... *C08J 5/121* (2013.01); *C08J 7/042* (2013.01); *C08K 3/22* (2013.01); *C08K 5/0066* (2013.01); *C09D 5/14* (2013.01); *C09D 11/102* (2013.01); *C09D 127/14* (2013.01); *B32B 2255/10* (2013.01); *B32B 2255/26* (2013.01); *B32B 2262/101* (2013.01); *B32B 2270/00* (2013.01); *B32B 2307/3065* (2013.01); *B32B 2307/4023* (2013.01); *B32B 2307/7376* (2023.05); *B32B 2607/02* (2013.01); *C08J 2323/06* (2013.01); *C08J 2423/12* (2013.01); *C08J 2427/14* (2013.01); *C08J 2453/00* (2013.01); *C08J 2475/04* (2013.01); *C08K 2003/2224* (2013.01)

(56) References Cited

FOREIGN PATENT DOCUMENTS

| TW | 202116565 | A | 5/2021 |
|---|---|---|---|
| TW | 202206268 | A | 2/2022 |

* cited by examiner

ANTI-BACTERIAL AND FLAME-RETARDANT WALL COVERING STRUCTURE

CROSS-REFERENCE TO RELATED PATENT APPLICATION

This application claims the benefit of priority to Taiwan Patent Application No. 112136536, filed on Sep. 25, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wall covering structure, and more particularly to an anti-bacterial and flame-retardant wall covering structure.

BACKGROUND OF THE DISCLOSURE

In the related art, a conventional anti-fouling and anti-bacterial plastic wall cover R is made from a PVC film a (i.e., a polyvinyl chloride film). A mesh layer b is disposed on the PVC film a. An ink layer c is printed on the mesh layer b, and an anti-bacterial layer d is coated on the ink layer c to complete the fabrication of the wall cover.

However, PVC additives a' (e.g., plasticizers and stabilizers) that are incorporated into the PVC film a may be gradually released due to changes in temperature and humidity in the surrounding environment. This phenomenon not only causes hazards to both the environment and human health, but may also lead to issues like contamination, mold growth, or even peeling in the plastic materials.

SUMMARY OF THE DISCLOSURE

In response to the above-referenced technical inadequacies, the present disclosure provides an anti-bacterial and flame-retardant wall covering structure.

In order to solve the above-mentioned problems, one of the technical aspects adopted by the present disclosure is to provide an anti-bacterial and flame-retardant wall covering structure that includes a fiber substrate, a first polyolefin substrate, a second polyolefin substrate, and an anti-bacterial layer. The first polyolefin substrate is formed on a surface of the fiber substrate. The second polyolefin substrate is formed on another surface of the fiber substrate. The anti-bacterial layer is formed on a surface of the second polyolefin substrate away from the fiber substrate. The anti-bacterial layer includes a fluorine-containing polymer. The first polyolefin substrate and the second polyolefin substrate are each formed from a polyolefin composition that includes a first polyolefin resin material, a second polyolefin resin material, and a flame-retardant additive material. The first polyolefin resin material is a polyethylene resin. The second polyolefin resin material is a polypropylene resin that includes a propylene block copolymer. Based on a total weight of the polyolefin composition being 100 parts by weight, a content of the propylene block copolymer is not less than 5 parts by weight.

In one of the possible or preferred embodiments, a material of the fiber substrate is selected from the group consisting of: glass fibers, polyester fibers, quartz fibers, carbon fibers, and Kevlar® fibers.

In one of the possible or preferred embodiments, the material of the fiber substrate is the glass fibers, a weave pattern of the fiber substrate is a plain weave, and a thickness of the fiber substrate is between 150 micrometers and 200 micrometers.

In one of the possible or preferred embodiments, both the first polyolefin substrate and the second polyolefin substrate do not contain plasticizers and stabilizers.

In one of the possible or preferred embodiments, the first polyolefin resin material is linear low-density polyethylene (LLDPE).

In one of the possible or preferred embodiments, the first polyolefin substrate and the second polyolefin substrate are respectively formed on the surface and the another surface of the fiber substrate by hot pressing, so as to form a sandwich laminate.

In one of the possible or preferred embodiments, based on the total weight of the polyolefin composition being 100 parts by weight, a content of the first polyolefin resin material is between 30 parts by weight and 60 parts by weight, a content of the second polyolefin resin material is between 30 parts by weight and 60 parts by weight, and a content of the flame-retardant additive material is between 1 part by weight and 10 parts by weight.

In one of the possible or preferred embodiments, the second polyolefin resin material includes a propylene homo-polymer and the propylene block copolymer.

In one of the possible or preferred embodiments, based on the total weight of the polyolefin composition being 100 parts by weight, a content of the propylene homo-polymer is between 30 parts by weight and 50 parts by weight, and the content of the propylene block copolymer is between 5 parts by weight and 25 parts by weight.

In one of the possible or preferred embodiments, the propylene block copolymer has at least a segment composed of a polyolefin elastomer (POE), and the polyolefin elastomer is selected from the group consisting of: a binary ethylene-propylene rubber, an ethylene-propylene-diene monomer terpolymer, and a polyisobutylene.

In one of the possible or preferred embodiments, the polyolefin elastomer is the binary ethylene-propylene rubber, and a mass proportion of the segment composed of the polyolefin elastomer in the propylene block copolymer is between 5 wt % and 20 wt %.

In one of the possible or preferred embodiments, the flame-retardant additive material at least includes an organic flame-retardant additive, and the organic flame-retardant additive is selected from the group consisting of: a nitrogen-phosphorus flame-retardant additive, a phosphorus flame-retardant additive, a nitrogen flame-retardant additive, a brominated flame-retardant, and a red phosphorus flame-retardant additive.

In one of the possible or preferred embodiments, the flame-retardant additive material further includes an inorganic flame-retardant additive.

In one of the possible or preferred embodiments, in the anti-bacterial layer, the fluorine-containing polymer is selected from the group consisting of: polyvinylidene fluoride, polytetrafluoroethylene, and poly-fluoroethylene.

In one of the possible or preferred embodiments, a thickness of the first polyolefin substrate is between 100 micrometers and 350 micrometers, a thickness of the fiber substrate is between 150 micrometers and 200 micrometers, a thickness of the second polyolefin substrate is between 100 micrometers and 350 micrometers, and a thickness of the anti-bacterial layer is between 5 micrometers and 50 micrometers.

In one of the possible or preferred embodiments, the anti-bacterial and flame-retardant wall covering structure further includes an ink layer that is formed on a surface of the anti-bacterial layer away from the second polyolefin substrate or formed between the second polyolefin substrate and the anti-bacterial layer.

Therefore, the beneficial effects of the present disclosure are that the anti-bacterial and flame-retardant wall covering structure of the present disclosure involves forming two layers of flame-retardant polyolefin substrates (i.e., the first polyolefin substrate and the second polyolefin substrate) on both side surfaces of the fiber substrate to produce a sandwich laminate. An anti-bacterial layer including a fluorine-containing polymer is formed on a surface of the sandwich laminate, and an ink pattern is further printed on the anti-bacterial layer, thereby forming an anti-bacterial and flame-retardant wall covering structure that is environmentally friendly.

The anti-bacterial and flame-retardant wall covering structure of the present disclosure can replace the use of a conventional PVC composite fiberglass wall covering material. The wall covering structure of the present disclosure not only possesses flame retardancy and mechanical strength, but also does not include plasticizers and stabilizers in the two layers of flame-retardant polyolefin substrates. Accordingly, the problem that plasticizers and the stabilizers are released due to environmental changes can be resolved. In the present disclosure, the flame-retardant additives added in the two layers of the flame-retardant polyolefin substrates contain organic and inorganic flame-retardants. Additionally, by disposing the two layers of the flame-retardant polyolefin substrates respectively on two side surfaces of the fiber substrate to sandwich the fiber substrate, superior flame-retardant effects and good mechanical strength can be achieved, thereby enabling the anti-bacterial and flame-retardant wall covering structure of the present disclosure to be suitable for outdoor use.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
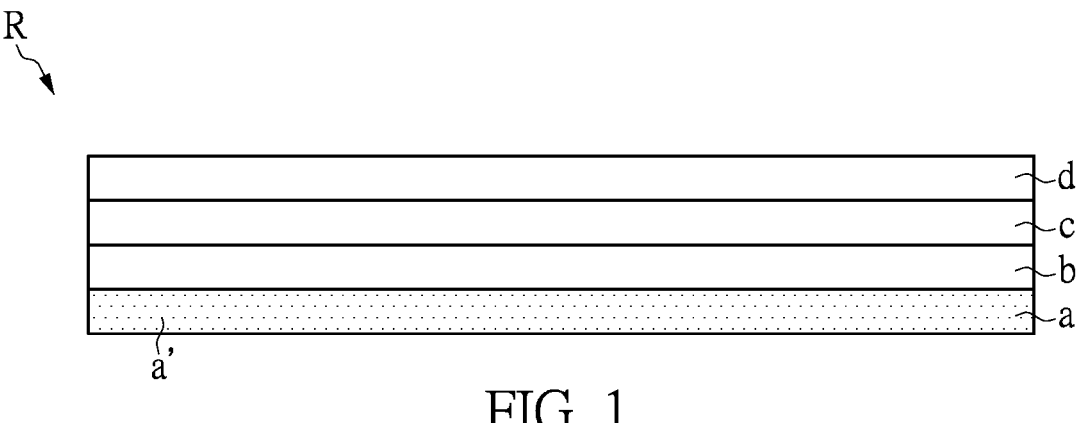
FIG. 1 is a schematic view of a conventional plastic wall covering laminated structure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Anti-Bacterial and Flame-Retardant Wall Covering Structure

Figure 2:
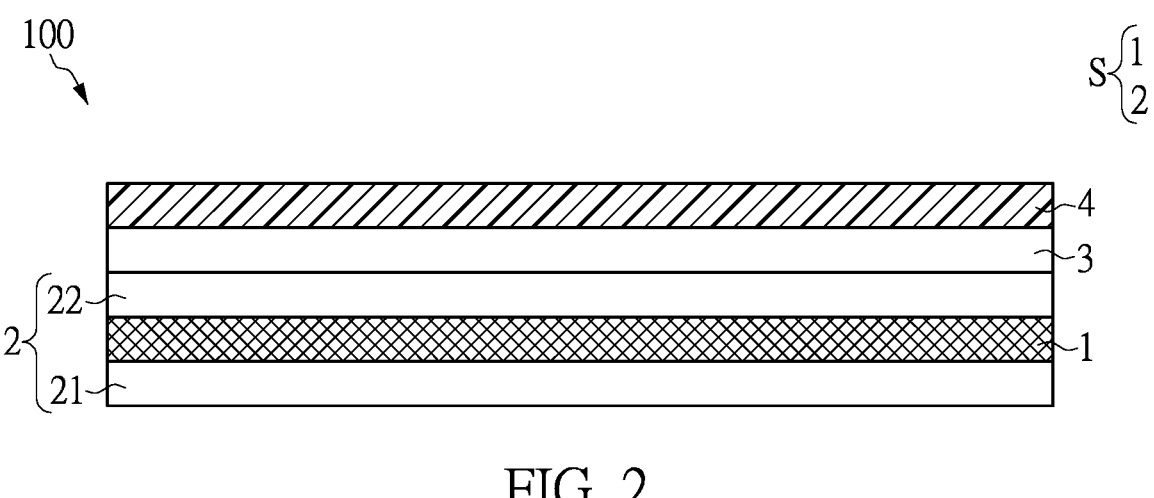
FIG. 2 is a schematic view of a wall covering structure according to an embodiment of the present disclosure.

Referring to FIG. 2, an embodiment of the present disclosure provides an anti-bacterial and flame-retardant wall covering structure 100 that includes a fiber substrate 1, a polyolefin material 2, an anti-bacterial layer 3, and an ink layer 4.

The polyolefin material 2 further includes a first polyolefin substrate 21 and a second polyolefin substrate 22. The first polyolefin substrate 21 and the second polyolefin substrate 22 are formed on two opposite side surfaces of the fiber substrate 1, respectively. In other words, the fiber substrate 1 is sandwiched between the first polyolefin substrate 21 and the second polyolefin substrate 22.

In the present embodiment, the first polyolefin substrate 21 and the second polyolefin substrate 22 are formed on the two opposite side surfaces of the fiber substrate 1 by hot pressing, thereby forming a sandwich laminate S.

Furthermore, the anti-bacterial layer 3 is formed on a surface of the sandwich laminate S. More specifically, the anti-bacterial layer 3 is formed on a surface of the second polyolefin substrate 22 away from the fiber substrate 1.

Furthermore, the ink layer 4 is formed on a surface of the anti-bacterial layer 3 away from the second polyolefin substrate 22 to present a visual pattern or a colored appearance. However, a formation position of the ink layer 4 is not limited thereto.

Figure 3:
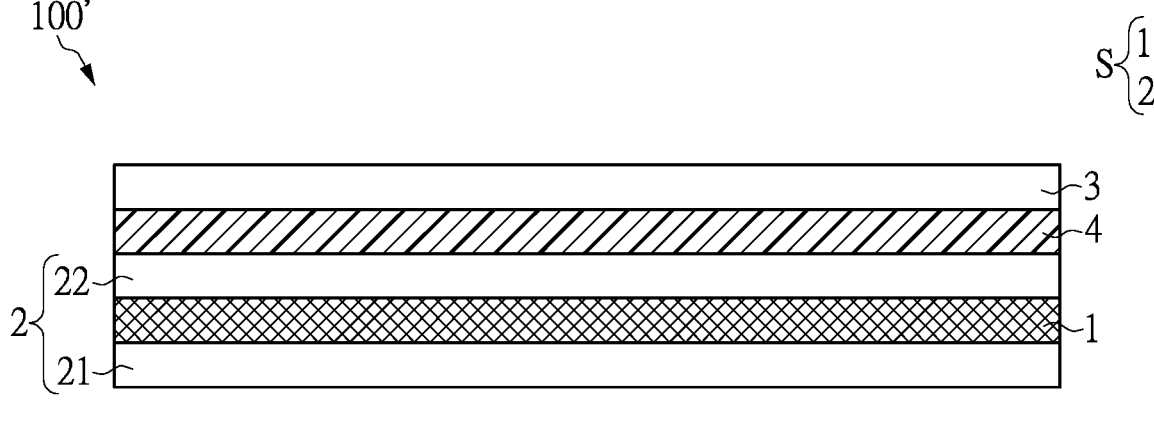
FIG. 3 is a schematic view of a wall covering structure according to another embodiment of the present disclosure.

As shown in FIG. 3, in an anti-bacterial and flame-retardant wall covering structure 100' according to another embodiment of the present disclosure, the ink layer 4 can also be formed between the second polyolefin substrate 22 of the sandwich laminate S and the anti-bacterial layer 3, and the anti-bacterial layer 3 has light transmittance, so that the visual pattern or colored appearance of the ink layer 4 can be presented through the anti-bacterial layer 3.

It is worth mentioning that, in the wall covering structure 100 of the present embodiment, the sandwich laminate S that is composed of the first polyolefin substrate 21, the fiber substrate 1, and the second polyolefin substrate 22, has flame retardancy (e.g., VTM-0 in UL94 flame retardancy grade testing) and mechanical strength.

The wall covering structure 100 of the present embodiment can replace the use of a conventional PVC composite fiberglass wall covering material. Both the first polyolefin substrate 21 and the second polyolefin substrate 22 do not include plasticizers and stabilizers. Accordingly, the problem that plasticizers and stabilizers are released due to environmental changes can be avoided.

Accordingly, the wall covering structure 100 of the present embodiment causes reduced hazards to the environment and human health, and the occurrence of stains, mold, or peeling on the fabric can be minimized.

To achieve the above-mentioned objectives, possible implementations of the fiber substrate 1, the polyolefin material 2 (i.e., the first polyolefin substrate 21 and the second polyolefin substrate 22), the anti-bacterial layer 3, and the ink layer 4 are described in detail below.

In some embodiments of the present disclosure, a material of the fiber substrate 1 is selected from the group consisting of: glass fibers, polyester fibers, quartz fibers, carbon fibers, and Kevlar® fibers.

In a preferred embodiment of the present disclosure, the fiber substrate 1 is made of glass fibers.

In some embodiments of the present disclosure, the fiber substrate 1 is a woven fabric. A weave pattern (i.e., texture) of the fiber substrate 1 is plain weave, twill weave, or satin weave.

In a preferred embodiment of the present disclosure, the weave pattern (i.e., texture) of the fiber substrate 1 is plain weave.

In some embodiments of the present disclosure, the fiber substrate 1 is made of a plurality of fibers through false-twist texturing. Furthermore, a diameter of each of the fibers is between 1 micrometer and 20 micrometers, preferably between 4 micrometers and 13 micrometers, and more preferably between 7 micrometers and 11 micrometers.

Furthermore, a thickness of the fiber substrate 1 is between 10 micrometers and 250 micrometers, and preferably between 150 micrometers and 200 micrometers.

For example, the thickness of the fiber substrate 1 can be 171 micrometers, 172 micrometers, 173 micrometers, 174 micrometers, or 175 micrometers, but the present disclosure is not limited thereto.

In some embodiments of the present disclosure, the fiber substrate 1 has a warp count of between 30 and 80 yarns/inch, and preferably between 30 and 40 yarns/inch. Furthermore, the fiber substrate 1 has a weft count of between 30 and 80 yarns/inch, and preferably between 30 and 40 yarns/inch. The warp count is a number of yarns arranged in one inch along a length direction of the fabric. The weft count is a number of yarns arranged in one inch along a width direction of the fabric.

According to the above configuration, the wall covering structure 100 can have a certain supporting strength, a certain degree of flame resistance, and an improved touch feeling through the fiber substrate 1.

Further, the first polyolefin substrate 21 is formed from a polyolefin composition. The polyolefin composition includes: a first polyolefin resin material, a second polyolefin resin material, and a flame-retardant additive material.

The first polyolefin resin material is a polyethylene resin (PE resin), and the polyethylene resin is preferably linear low-density polyethylene (LLDPE).

In terms of content range, based on a total weight of the polyolefin composition being 100 parts by weight (or based on the total weight of the first polyolefin substrate 21 being 100 parts by weight), a content of the first polyolefin resin material (i.e., polyethylene resin) is between 30 parts by weight and 60 parts by weight, and preferably between 35 parts by weight and 55 parts by weight.

It should be noted that the meaning of "parts by weight" used in this disclosure is equivalent to "weight percentage" or "wt %".

The second polyolefin resin material is a polypropylene resin (PP resin), and the second polyolefin resin material includes: a propylene homo-polymer and a propylene block copolymer.

Furthermore, the propylene block copolymer has at least a segment composed of a polyolefin elastomer (POE).

The polyolefin elastomer (POE) can be selected from the group consisting of: a binary ethylene-propylene rubber (i.e., EPR rubber), an ethylene-propylene-diene monomer terpolymer (i.e., EPDM rubber), and a polyisobutylene (i.e., PIB).

In a preferred embodiment, the polyolefin elastomer (POE) is the binary ethylene-propylene rubber (also called as an ethylene-propylene elastomer). More specifically, the propylene block copolymer is a copolymer of polypropylene (PP) and the binary ethylene-propylene rubber (EPR) (i.e., a copolymer of polypropylene blended with EPR), but the present disclosure is not limited thereto.

Furthermore, a mass proportion of the segment composed of the polyolefin elastomer (i.e., EPR) in the propylene block copolymer can be, for example, between 5% and 20%, and preferably between 10% and 15%. In a specific embodiment, the mass proportion of the segment composed of the polyolefin elastomer in the propylene block copolymer is 12%.

In addition, a weight ratio between ethylene (PE) and propylene (PP) in the segment composed of the polyolefin elastomer (i.e., EPR) can be, for example, 20% to 40%: 60% to 80%, and preferably 25% to 35%: 65% to 75%. In a specific embodiment, the weight ratio between ethylene (PE) and propylene (PP) in the segment is 30%: 70%, but is not limited thereto.

In terms of content range, based on the total weight of the polyolefin composition being 100 parts by weight, a content of the second polyolefin resin material (i.e., the polypropylene resin) is between 30 parts by weight and 60 parts by weight, and preferably between 35 parts by weight and 55 parts by weight.

More specifically, in one embodiment, the second polyolefin resin material includes a propylene homo-polymer and a propylene block copolymer. Based on the total weight of the polyolefin composition being 100 parts by weight, a content of the propylene homo-polymer is between 30 and 50 parts by weight, and preferably between 35 and 45 parts by weight.

In addition, the content of the propylene block copolymer is not less than 5 parts by weight, preferably between 5 parts by weight and 25 parts by weight, and more preferably between 10 parts by weight and 20 parts by weight.

Furthermore, the flame-retardant additive material at least includes an organic flame-retardant additive, and the organic flame-retardant additive is selected from the group consisting of: a nitrogen-phosphorus flame-retardant additive, a phosphorus flame-retardant additive, a nitrogen flame-retardant additive, a brominated flame-retardant, and a red phosphorus flame-retardant additive. In a preferred embodiment, the organic flame-retardant additive is the nitrogen-phosphorus flame-retardant additive.

In some embodiments of the present disclosure, the flame-retardant additive material further includes an inorganic flame-retardant additive, and the inorganic flame-retardant additive can be, for example, at least one of magnesium hydroxide, antimony trioxide, and aluminum hydroxide, and the inorganic flame-retardant additive is preferably magnesium hydroxide.

In terms of content range, based on the total weight of the polyolefin composition being 100 parts by weight, a content of the flame-retardant additive material is between 1 part by weight and 10 parts by weight, and preferably between 3 parts by weight and 8 parts by weight.

More specifically, in a preferred embodiment, the flame-retardant additive material includes both the organic flame-retardant additive and the inorganic flame-retardant additive. Based on the total weight of the polyolefin composition being 100 parts by weight, the content of the organic flame-retardant additive is between 1 part by weight and 5 parts by weight, and preferably between 2 parts by weight and 4 parts by weight. Furthermore, the content of the inorganic flame-retardant additive is between 3 parts by weight and 8 parts by weight, and preferably between 3 parts by weight and 7 parts by weight. The flame-retardant additive material assists the wall covering structures 100, 100' in inhibiting or resisting the spread of flames.

In terms of thickness range, the thickness of the first polyolefin substrate 21 is between 100 micrometers and 350 micrometers, preferably between 200 micrometers and 300 micrometers, and more preferably between 240 micrometers and 260 micrometers.

It is worth mentioning that in the present embodiment, the polyolefin composition for forming the first polyolefin substrate 21 does not contain plasticizers and stabilizers.

In particular, the polyolefin composition does not contain plasticizers (e.g., DHEH, DHIN, DBP, DEHP and other plasticizers) and stabilizers (e.g., PVC heat stabilizers) that are used for the polyvinyl chloride (PVC) resin, but the present disclosure is not limited thereto.

Accordingly, in the related art, the problem of plasticizers and stabilizers being released from a conventional PVC composite fiberglass wall covering material due to environmental changes can be effectively resolved.

Further, similar to the above-mentioned first polyolefin substrate 21, the second polyolefin substrate 122 is also formed of a polyolefin composition. The polyolefin composition includes: a first polyolefin resin material, a second polyolefin resin material, and a flame-retardant additive material.

The material characteristics and content ranges of the first polyolefin resin material, the second polyolefin resin material, and the flame-retardant additive material are similar to the above-mentioned first polyolefin substrate 21, and will not be reiterated herein.

That is, each of the first polyolefin substrate 21 and the second polyolefin substrate 22 is formed from a polyolefin composition that includes a first polyolefin resin material, a second polyolefin resin material, and a flame-retardant additive material.

It should be noted that, the specific materials and content ranges between the first polyolefin substrate 21 and the second polyolefin substrate 22 can be the same or slightly different from each other, and the present disclosure is not limited thereto.

From another perspective, the wall covering structure 100 of the embodiment of the present disclosure includes two polyolefin substrates 21 and 22 that are respectively formed on both side surfaces of the fiber substrate 1 through thermal compression. Each of the polyolefin substrates is formed from a polyolefin composition. The polyolefin composition includes a first polyolefin resin material, a second polyolefin resin material, and a flame-retardant additive material.

In addition, in terms of thickness range, a thickness of the second polyolefin substrate 22 is between 100 micrometers and 350 micrometers, preferably between 200 micrometers and 300 micrometers, and more preferably between 240 micrometers and 260 micrometers.

As shown in FIG. 2, the anti-bacterial layer 3 is formed on a surface of the sandwich laminate S. Specifically, the anti-bacterial layer 3 is formed on a surface of the second polyolefin substrate 22 away from the fiber substrate 1.

The anti-bacterial layer 3 includes at least a fluorine-containing polymer. Based on a total weight of the anti-bacterial layer 3 being 100 parts by weight, a content of the fluorine-containing polymer is not less than 70 parts by weight, and preferably between 70 parts by weight and 90 parts by weight.

The fluorine-containing polymer is selected from the group consisting of: polyvinylidene fluoride (PVDF), polytetrafluoroethylene (PTFE), and polyvinyl fluoride (PVF). Preferably, the fluorine-containing polymer is polyvinyl fluoride (PVF).

In the present embodiment, the anti-bacterial layer 3 is a single-layer structure and has a thickness of between 5 micrometers and 50 micrometers, and preferably between 10 micrometers and 25 micrometers, but the present disclosure is not limited thereto.

Furthermore, in an unillustrated embodiment of the present disclosure, the anti-bacterial layer 3 further includes an auxiliary layer and a fluorine-containing polymer layer. The polyolefin substrate (i.e., the second polyolefin substrate 22) is connected to the auxiliary layer or connected to the fluorine-containing polymer layer. The fluorine-containing polymer layer includes the fluorine-containing polymer. Based on the total weight of the anti-bacterial layer 3 being 100 parts by weight, the content of the fluorine-containing polymer is not less than 70 parts by weight, and preferably between 70 parts by weight and 90 parts by weight, but the present disclosure is not limited thereto.

In addition, a material of the auxiliary layer can be, for example, at least one of poly(methyl methacrylate) (PMMA) and polyurethane (PU).

Furthermore, the anti-bacterial layer 3 has a thickness of between 5 micrometers and 50 micrometers, and preferably between 10 micrometers and 25 micrometers. A thickness ratio between the auxiliary layer and the fluorine-containing polymer layer is between 1 to 5:1 to 5, but the present disclosure is not limited thereto.

As shown in FIG. 2, the ink layer 4 is printed on a surface of the anti-bacterial layer 3 away from the second polyolefin substrate 22, so as to present a visual pattern or a colored appearance. Alternatively, as shown in FIG. 3, the ink layer 4 can be formed between the sandwich laminate S and the anti-bacterial layer 3. The anti-bacterial layer 3 has light transmittance, so that the visual pattern or the colored appearance of the ink layer 4 can be presented through the anti-bacterial layer 3. In some embodiments, a thickness of the ink layer 4 is between 0.5 micrometers and 3 micrometers.

In an embodiment of the present disclosure, a material of the ink layer 4 is a water-based resin ink to improve the film-forming property of the ink layer 4 and to be environmentally friendly, but the present disclosure is not limited thereto.

The material composition of the ink layer 4 is a conventional art, and will not be reiterated herein.

According to the above configuration, the anti-bacterial and flame-retardant wall covering structure 100 of the embodiment of the present disclosure primarily involves hot pressing two layers of flame-retardant polyolefin substrates (i.e., the first polyolefin substrate 21 and the second polyolefin substrate 22) on both side surfaces of the fiber substrate 1, so as to produce a sandwich laminate S with flame resistance (UL-94 VTM-0) and mechanical strength. An anti-bacterial layer 3 including a fluorine-containing polymer is formed on a surface of the sandwich laminate S, and an ink layer 4 (i.e., ink pattern) is further printed on the anti-bacterial layer 3, thereby forming the anti-bacterial and flame-retardant wall covering structure 100 that is environmentally friendly.

The anti-bacterial and flame-retardant wall covering structure 100 of the present disclosure can replace the use of a conventional PVC composite fiberglass wall covering material. The anti-bacterial and flame-retardant wall covering structure 100 of the present disclosure not only possesses flame retardancy and mechanical strength, but also does not include plasticizers and stabilizers in the two layers of flame-retardant polyolefin substrates (i.e., the first polyolefin substrate 21 and the second polyolefin substrate 22). Accordingly, the problem that plasticizers and stabilizers are released due to environmental changes can be resolved.

In the present disclosure, the flame-retardant additives added in the two layers of the flame-retardant polyolefin substrates contain organic flame-retardants (e.g., nitrogen-phosphorus flame retardant) and inorganic flame-retardants (e.g., magnesium hydroxide). Additionally, by sandwiching the two layers of the flame-retardant polyolefin substrates on both side surfaces of the fiber substrate 1 (e.g., a glass fiber substrate), superior flame-retardant effects and good mechanical strength can be achieved, thereby enabling the anti-bacterial and flame-retardant wall covering structure 100 of the present disclosure to be suitable for outdoor use.

Experimental Data and Test Results

Hereinafter, Exemplary Examples 1-3 and Comparative Example 1 are used to describe the contents of the present disclosure in detail. However, the following examples are only provided to aid in understanding of the present disclosure, and are not to be construed as limiting the scope of the present disclosure. Exemplary Examples 1-3 are exemplary embodiments of the present disclosure. Comparative Example 1 is a control group, which is used to prove that Exemplary Examples 1-3 have good technical effects.

In Exemplary Example 1, a glass fiber with a plain weave and a thickness of 173 micrometers is provided. A first polyolefin substrate and a second polyolefin substrate are hot-pressed onto both side surfaces of the fiber substrate to form a sandwich laminate. A composition of the first polyolefin substrate includes 42 parts by weight of linear low-density polyethylene (LLDPE), 40 parts by weight of propylene homo-polymer, 10 parts by weight of propylene block copolymer (with 12 mass % of EPR segment), 3 parts by weight of nitrogen-phosphorus flame retardant (organic flame retardant), and 5 parts by weight of magnesium hydroxide (inorganic flame retardant). Similarly, a composition of the second polyolefin substrate includes 42 parts by weight of linear low-density polyethylene (LLDPE), 40 parts by weight of propylene homo-polymer, 10 parts by weight of propylene block copolymer (with 12 mass % of EPR segment), 3 parts by weight of nitrogen-phosphorus flame retardant (i.e., organic flame retardant), and 5 parts by weight of magnesium hydroxide (i.e., inorganic flame retardant). The first polyolefin substrate has a thickness of 250 micrometers, and the second polyolefin substrate has a thickness of 250 micrometers. Further, an anti-bacterial layer is formed on a surface of the sandwich laminate (i.e., a side surface of the second polyolefin substrate away from the glass fiber). The anti-bacterial layer contains 70 parts by weight of polyvinyl fluoride (PVF). The anti-bacterial layer has a single-layer structure that has a thickness of 15 micrometers. A water-based resin ink (i.e., a PU water-based resin ink) is coated on the anti-bacterial layer and dried to form an ink layer with a thickness of approximately 1 micrometer, thereby completing the wall covering structure of Exemplary Example 1. In terms of test results, the wall covering structure provided in Exemplary Example 1 has good flame-retardant properties (i.e., UL-94 VTM-0), hand feel, antibacterial properties, and brush-priming properties.

In terms of evaluation of flame-retardant level, VTM-0 means stopping burning within 10 seconds on a vertical specimen, and only non-flaming drips of particles are allowed. VTM-1 means stopping burning within 30 seconds on a vertical specimen, and only non-flaming drips of particles are allowed. VTM-2 means stopping burning within 30 seconds on a vertical specimen, and flaming drips of particles are allowed.

In Exemplary Example 2, a glass fiber with a plain weave and a thickness of 173 micrometers is provided. A first polyolefin substrate and a second polyolefin substrate are hot-pressed onto both side surfaces of the fiber substrate to form a sandwich laminate. A composition of the first polyolefin substrate includes 42 parts by weight of linear low-density polyethylene (LLDPE), 30 parts by weight of propylene homo-polymer, 20 parts by weight of propylene block copolymer (with 12 mass % of EPR segment), 3 parts by weight of nitrogen-phosphorus flame retardant (organic flame retardant), and 5 parts by weight of magnesium hydroxide (inorganic flame retardant). Similarly, a composition of the second polyolefin substrate includes 42 parts by weight of linear low-density polyethylene (LLDPE), 30 parts by weight of propylene homo-polymer, 20 parts by weight of propylene block copolymer (with 12 mass % of EPR segment), 3 parts by weight of nitrogen-phosphorus flame retardant (i.e., organic flame retardant), and 5 parts by weight of magnesium hydroxide (i.e., inorganic flame retardant). The first polyolefin substrate has a thickness of 250 micrometers, and the second polyolefin substrate has a thickness of 250 micrometers. Further, an anti-bacterial layer is formed on a surface of the sandwich laminate (i.e., a side surface of the second polyolefin substrate away from the glass fiber). The anti-bacterial layer contains 70 parts by weight of polyvinyl fluoride (PVF). The anti-bacterial layer has a single-layer structure that has a thickness of 15 micrometers. A water-based resin ink (i.e., a PU water-based resin ink) is coated on the anti-bacterial layer and dried to form an ink layer with a thickness of approximately 1 micrometer, thereby completing the wall covering structure of Exemplary Example 2. In terms of test results, the wall covering structure provided in Exemplary Example 2 has good flame-retardant (i.e., UL-94 VTM-0) properties, hand feel, antibacterial properties, and brush-priming properties.

In Exemplary Example 3, a glass fiber with a plain weave and a thickness of 173 micrometers is provided. A first polyolefin substrate and a second polyolefin substrate are hot-pressed onto both side surfaces of the fiber substrate to form a sandwich laminate. A composition of the first polyolefin substrate includes 47 parts by weight of linear low-density polyethylene (LLDPE), 40 parts by weight of propylene homo-polymer, 10 parts by weight of propylene block copolymer (with 12 mass % of EPR segment), 3 parts by weight of nitrogen-phosphorus flame retardant (organic flame retardant), and does not include inorganic flame retardant. Similarly, a composition of the second polyolefin substrate includes 47 parts by weight of linear low-density polyethylene (LLDPE), 40 parts by weight of propylene homo-polymer, 10 parts by weight of propylene block copolymer (with 12 mass % of EPR segment), 3 parts by weight of nitrogen-phosphorus flame retardant (i.e., organic flame retardant), and does not include inorganic flame retardant. The first polyolefin substrate has a thickness of 250 micrometers, and the second polyolefin substrate has a thickness of 250 micrometers. Further, an anti-bacterial layer is formed on a surface of the sandwich laminate (i.e., a side surface of the second polyolefin substrate away from the glass fiber). The anti-bacterial layer contains 70 parts by weight of polyvinyl fluoride (PVF). The anti-bacterial layer has a single-layer structure that has a thickness of 15 micrometers. A water-based resin ink (i.e., a PU water-based resin ink) is coated on the anti-bacterial layer and dried to form an ink layer with a thickness of approximately 1 micrometer, thereby completing the wall covering structure of Exemplary Example 3. In terms of test results, the wall covering structure provided in Exemplary Example 3 has good flame-retardant properties (i.e., UL-94 VTM-1), hand feel, antibacterial properties, and brush-priming properties.

In Comparative Example 1, a main difference between Comparative Example 1 and the above-mentioned Exemplary Examples 1-3 is that no propylene block copolymer and organic flame retardant (e.g., nitrogen-phosphorus flame retardant) are used. More specifically, in Comparative Example 1, a glass fiber with a plain weave and a thickness of 173 micrometers is provided. A first polyolefin substrate and a second polyolefin substrate are hot-pressed onto both side surfaces of the fiber substrate to form a sandwich laminate. A composition of the first polyolefin substrate includes 45 parts by weight of linear low-density polyethylene (LLDPE), 50 parts by weight of propylene homo-polymer and 5 parts by weight of magnesium hydroxide (i.e., inorganic flame retardant). Similarly, a composition of the second polyolefin substrate includes 45 parts by weight of linear low-density polyethylene (LLDPE), 50 parts by weight of propylene homo-polymer and 5 parts by weight of magnesium hydroxide (i.e., inorganic flame retardant). The first polyolefin substrate has a thickness of 250 micrometers, and the second polyolefin substrate has a thickness of 250 micrometers. Further, an anti-bacterial layer is formed on a surface of the sandwich laminate (i.e., a side surface of the second polyolefin substrate away from the glass fiber). The anti-bacterial layer contains 70 parts by weight of polyvinyl fluoride (PVF). The anti-bacterial layer has a single-layer structure that has a thickness of 15 micrometers. A water-based resin ink (i.e., a PU water-based resin ink) is coated on the anti-bacterial layer and dried to form an ink layer with a thickness of approximately 1 micrometer, thereby completing the wall covering structure of Comparative Example 1. In terms of test results, the wall covering structure provided in Comparative Example 1 has poor flame-retardant (i.e., UL-94 VTM-2) and poor hand feel.

It is worth mentioning that since the first and second polyolefin substrates of the above-mentioned Exemplary Examples 1 to 3 do not use plasticizers and stabilizers, the problem of plasticizers and stabilizers being released due to environmental changes can be avoided.

Beneficial Effects of the Embodiments

In conclusion, the anti-bacterial and flame-retardant wall covering structure 100 of the present disclosure primarily involves hot pressing two layers of flame-retardant polyolefin substrates (i.e., the first polyolefin substrate 21 and the second polyolefin substrate 22) on both side surfaces of the fiber substrate 1, so as to produce a sandwich laminate S with flame resistance and mechanical strength. An anti-bacterial layer 3 including a fluorine-containing polymer is formed on a surface of the sandwich laminate S, and an ink layer 4 (i.e., ink pattern) is further printed on the anti-bacterial layer 3, thereby forming the anti-bacterial and flame-retardant wall covering structure 100 that is environmentally friendly.

The anti-bacterial and flame-retardant wall covering structure 100 of the present disclosure can replace the use of a conventional PVC composite fiberglass wall covering material. The anti-bacterial and flame-retardant wall covering structure 100 of the present disclosure not only possesses flame retardancy and mechanical strength, but also does not include plasticizers and stabilizers in the two layers of flame-retardant polyolefin substrates (i.e., the first polyolefin substrate 21 and the second polyolefin substrate 22). Accordingly, the problem that plasticizers and stabilizers are released due to environmental changes can be resolved.

In the present disclosure, the flame-retardant additives added in the two layers of the flame-retardant polyolefin substrates contain organic flame-retardants (e.g., nitrogen-phosphorus flame retardant) and inorganic flame-retardants (e.g., magnesium hydroxide). Additionally, by disposing the two layers of the flame-retardant polyolefin substrates respectively on two side surfaces of the fiber substrate 1 (e.g., a glass fiber substrate) to sandwich the fiber substrate, superior flame-retardant effects and good mechanical strength can be achieved, thereby enabling the anti-bacterial and flame-retardant wall covering structure 100 of the present disclosure to be suitable for outdoor use.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An anti-bacterial and flame-retardant wall covering structure, comprising:
   a fiber substrate;
   a first polyolefin substrate formed on a surface of the fiber substrate;
   a second polyolefin substrate formed on another surface of the fiber substrate; and
   an anti-bacterial layer formed on a surface of the second polyolefin substrate away from the fiber substrate;
   wherein the anti-bacterial layer includes a fluorine-containing polymer;

wherein each of the first polyolefin substrate and the second polyolefin substrate is formed from a polyolefin composition that includes a first polyolefin resin material, a second polyolefin resin material, and a flame-retardant additive material;

wherein the first polyolefin resin material is a polyethylene resin, and the second polyolefin resin material is a polypropylene resin that includes a propylene block copolymer;

wherein, based on a total weight of the polyolefin composition being 100 parts by weight, a content of the propylene block copolymer is not less than 5 parts by weight.

2. The anti-bacterial and flame-retardant wall covering structure according to claim 1, wherein a material of the fiber substrate is selected from the group consisting of: glass fibers, polyester fibers, quartz fibers, and carbon fibers.

3. The anti-bacterial and flame-retardant wall covering structure according to claim 2, wherein the material of the fiber substrate is the glass fibers, a weave pattern of the fiber substrate is a plain weave, and a thickness of the fiber substrate is between 150 micrometers and 200 micrometers.

4. The anti-bacterial and flame-retardant wall covering structure according to claim 1, wherein both the first polyolefin substrate and the second polyolefin substrate do not contain plasticizers and stabilizers.

5. The anti-bacterial and flame-retardant wall covering structure according to claim 1, wherein the first polyolefin resin material is linear low-density polyethylene (LLDPE).

6. The anti-bacterial and flame-retardant wall covering structure according to claim 1, wherein the first polyolefin substrate and the second polyolefin substrate are respectively formed on the surface and the another surface of the fiber substrate by hot pressing, so as to form a sandwich laminate.

7. The anti-bacterial and flame-retardant wall covering structure according to claim 1, wherein, based on the total weight of the polyolefin composition being 100 parts by weight, a content of the first polyolefin resin material is between 30 parts by weight and 60 parts by weight, a content of the second polyolefin resin material is between 30 parts by weight and 60 parts by weight, and a content of the flame-retardant additive material is between 1 part by weight and 10 parts by weight.

8. The anti-bacterial and flame-retardant wall covering structure according to claim 1, wherein the second polyolefin resin material includes a propylene homo-polymer and the propylene block copolymer.

9. The anti-bacterial and flame-retardant wall covering structure according to claim 1, wherein, based on the total weight of the polyolefin composition being 100 parts by weight, a content of the propylene homo-polymer is between 30 parts by weight and 50 parts by weight, and the content of the propylene block copolymer is between 5 parts by weight and 25 parts by weight.

10. The anti-bacterial and flame-retardant wall covering structure according to claim 8, wherein the propylene block copolymer has at least a segment composed of a polyolefin elastomer (POE), and the polyolefin elastomer is selected from the group consisting of: a binary ethylene-propylene rubber, an ethylene-propylene-diene monomer terpolymer, and a polyisobutylene.

11. The anti-bacterial and flame-retardant wall covering structure according to claim 10, wherein the polyolefin elastomer is the binary ethylene-propylene rubber, and a mass proportion of the segment composed of the polyolefin elastomer in the propylene block copolymer is between 5 wt % and 20 wt %.

12. The anti-bacterial and flame-retardant wall covering structure according to claim 1, wherein the flame-retardant additive material at least includes an organic flame-retardant additive, and the organic flame-retardant additive is selected from the group consisting of: a nitrogen-phosphorus flame-retardant additive, a phosphorus flame-retardant additive, a nitrogen flame-retardant additive, a brominated flame-retardant, and a red phosphorus flame-retardant additive.

13. The anti-bacterial and flame-retardant wall covering structure according to claim 12, wherein the flame-retardant additive material further includes an inorganic flame-retardant additive.

14. The anti-bacterial and flame-retardant wall covering structure according to claim 1, wherein, in the anti-bacterial layer, the fluorine-containing polymer is selected from the group consisting of polyvinylidene fluoride, polytetrafluoroethylene, and poly-fluoroethylene.

15. The anti-bacterial and flame-retardant wall covering structure according to claim 1, wherein a thickness of the first polyolefin substrate is between 100 micrometers and 350 micrometers, a thickness of the fiber substrate is between 150 micrometers and 200 micrometers, a thickness of the second polyolefin substrate is between 100 micrometers and 350 micrometers, and a thickness of the anti-bacterial layer is between 5 micrometers and 50 micrometers.

16. The anti-bacterial and flame-retardant wall covering structure according to claim 1, further comprising: an ink layer being formed on a surface of the anti-bacterial layer away from the second polyolefin substrate or being formed between the second polyolefin substrate and the anti-bacterial layer.

\* \* \* \* \*